(12) United States Patent
Mann

(10) Patent No.: US 6,618,854 B1
(45) Date of Patent: *Sep. 9, 2003

(54) REMOTELY ACCESSIBLE INTEGRATED DEBUG ENVIRONMENT

(75) Inventor: Daniel Peter Mann, Austin, TX (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/802,393

(22) Filed: Feb. 18, 1997

(51) Int. Cl.$^7$ .............................................. G06F 9/44
(52) U.S. Cl. ...................................................... 717/124
(58) Field of Search ................................ 709/303, 300, 709/322, 323, 220, 221, 222, 310; 395/705; 717/4, 1, 124, 125; 714/38, 46; 345/866

(56) References Cited

U.S. PATENT DOCUMENTS

| | | | | |
|---|---|---|---|---|
| 5,553,223 A | * | 9/1996 | Greenlee et al. | ............ 395/155 |
| 5,706,502 A | * | 1/1998 | Foley et al. | ................. 395/610 |
| 5,761,513 A | * | 6/1998 | Yellin et al. | ................. 395/705 |
| 5,815,653 A | * | 9/1998 | You et al. | ............... 395/183.14 |
| 5,923,885 A | * | 7/1999 | Johnson et al. | ............. 395/712 |
| 6,058,393 A | * | 5/2000 | Merier et al. | ................. 707/10 |
| 6,119,247 A | * | 9/2000 | House et al. | ................. 714/38 |
| 6,138,140 A | * | 10/2000 | Yokote | ........................ 709/203 |

FOREIGN PATENT DOCUMENTS

| WO | WO96/38791 | 12/1996 |
|---|---|---|

OTHER PUBLICATIONS

D. Mann, "The Universal Debugger Interface", Dr. Dobb's Journal, pp. 58–68, Sep. 1992.*
IBM, "Remote System Debug Over the Internet," IBM technical Disclosure Bulletin, vol. 39, No. 11, pp. 11–12 (Nov. 1996).

* cited by examiner

Primary Examiner—Sue Lao
(74) Attorney, Agent, or Firm—Fletcher Yoder

(57) ABSTRACT

The remotely accessible Integrated Debug Environment of this invention permits a user having only a computer and an Internet connection to remotely access an IDE configured for operating and debugging a selected target microprocessor or microcontroller. An IDE is set up, including a host computer which operates as a web server and as a target/debug controller. One or more target processors may be connected to the host computer, along with debug equipment, such as logic analyzers, ICE equipment, overlay memory, etc. The host computer includes toolsets that correspond to the available target processor(s). In order to execute or debug code on a selected target processor, a user connects to the host computer using a web browser, with which the user can determine the availability of target processors and other pertinent information. The user can then download user interface software that will enable the user to implement an appropriate user interface on his computer, using the Internet to communicate with the host computer. Once the user interface is set up, the remote user can use the IDE system as though he were a local user, using control techniques familiar to those skilled in the art, to execute or debug software on the target processor. In preferred embodiments, the user interface is transmitted to the user as a Java bytecode, which is executable on most general purpose personal computers and workstations using widely available Java interpreters.

21 Claims, 3 Drawing Sheets

REMOTELY ACCESSIBLE INTEGRATED DEBUG ENVIRONMENT

TECHNICAL FIELD OF THE INVENTION

This invention relates to the field of microprocessor and microcontroller evaluation and testing, and in particular it relates to an integrated evaluation and debug environment that can be remotely accessed over the Internet or other data communication system.

BACKGROUND

Integrated Debug Environments (IDE) are well known in the art of electronic design and integrated circuit testing and evaluation. An IDE is a combination of hardware and software elements that permits an engineer to operate and test an integrated circuit such as a microprocessor or a microcontroller (collectively referred to as "processors"), which is usually incorporated into an electronic system including other connected elements such as, for example, memory, clocks, and input/output circuitry (hereinafter referred to as the "target system"). An IDE typically provides an engineer or programmer with a substantial amount of control and insight into the detailed workings of the target system, allowing the user to control the input signals, the memory contents, the speed of operation, and other aspects of the target's operation. An IDE typically also allows the user to observe the operation of the target in detail, typically using a logic analyzer and other devices to monitor various externally observable circuit elements, as well as the processor state at selected points during program execution. An IDE may also interface with in-circuit emulation functionality that may be built into the target system, which can allow the user to obtain information regarding even the internal operation of an integrated circuit, such as a microprocessor. An IDE provides an interface for a user to do something as simple as running a program on the target system and observing the output, or as complex as debugging a sophisticated program that is run by a microcontroller that is installed in an operating product, such as a computer or a printer. Debugging may include determining where a program is not behaving as expected and why, and may involve taking control of the clock, memory, I/O and other aspects of the target system and comprehensively analyzing the behavior of the processor in response to various combinations of stimuli. An engineer can also use an IDE to "tune" a system to optimize performance.

Setting up an IDE can be a costly undertaking. Each person or company who wants to evaluate a processor or to debug a program running on a certain processor must set up and configure an IDE for that processor. Referring to FIG. 1, an IDE typically includes a host computer 104 including target control software and appropriate software toolsets (compilers, linkers, library files, locators, etc.), a target system 108 (which is often a printed circuit board holding the target device and peripheral components), memory emulator 110, debug monitor 112, logic analyzer 114, appropriate connectors 116, and a user interface 106 (typically a computer or workstation with appropriate software) having a connection 106 to the host computer. Memory emulator 110 may alternatively be a ROM emulator or an overlay memory, and it may be connected to the target system 108 directly or through a debug monitor or other means familiar to those skilled in the art. The software toolset must be available for producing code that is executable on the target system. Such a toolset typically includes compilers, linkers, locators, interpreters and debuggers, which are typically specialized for taking a program from a particular high level language (e.g. C++) and turning it into code that can be executed on a particular target (e.g. a 486-class microprocessor). Additional capabilities may be provided by browsers, profilers and assorted libraries. In order to evaluate a target device or to debug a program, a complete IDE system must be obtained or constructed for each target to be tested or debugged, at the cost of acquiring all of the required hardware and software, plus the (often substantial) cost of installing, configuring, and debugging the IDE system. This cost is often too high to allow an engineer to evaluate how a program will run on each of several different microcontrollers, so the engineer has to select one or a few target devices to test, because the cost of setting up an IDE to test additional target devices is prohibitive. A system is needed where a shared IDE can be set up at a central location to perform test and debug functions for a particular target system, or a class of target systems, such that the IDE can be accessed by remote users. The desired system would allow the debug operation to be completely controlled by the user from a remote location, as though the user were physically operating the IDE host machine locally.

The user interface of a modern IDE is itself a complex computer program, or a collection of programs. The user interface of an IDE is typically installed on a computer that is dedicated, at least in part, to operating the IDE. The user interface computer is usually either directly connected to the IDE host computer (or it may be the host computer), or it is connected to the host computer by a private network. Interface software is typically platform specific, so that a different user interface program is typically required for each type of computer (e.g. x86, Sparc, HP, Macintosh) that may be used as an interface. Furthermore, the user must locate, acquire, install and debug the user interface software on a suitable computer before the IDE can be used. A user interface is desired that can be easily located, downloaded over a network and installed on a user's machine so that it will be a simple task to set up a fully functional user interface at a location remote from the host computer, so that the interface could communicate with the host over a network, eliminating the need for the user to be physically proximate to the host machine.

FIG. 2 shows a prior, remotely accessible target device testing system 200, known to the inventor, in which host computer 204 was located in a central location. Referring to FIG. 2, several different processors were configured into target systems 202A–D which were attached to host computer 204, such that programs generated by the host could be executed on target systems 202 as selected by a user. A user could connect a remote computer 206 to host system 204, using modems 208A–B to communicate across telephone network 210. The user would use a command line interface to have a computer program run on a selected target system 208 under the control of host 204. The program's output was then returned to user's computer 206 via the modems 208A–B and phone system 210. To use this system, the user only needed basic telecommunication software and a modem; the interface permitted only limited control of the debug environment. While this system was useful for certain limited applications, it was not a substitute for a full-fledged debug environment, and it did not lend itself well to allowing customers to dial-in to experiment with the target devices.

It is desired to provide a full-featured IDE, with one or more associated target systems, that is fully operable from a remote location. In other words, it is desirable for a remote user to have an interface to a comprehensive debug system that is similar or identical to an interface that is typically used with a local IDE system. Such a system is not known to exist in the prior art. It is further desirable for a remote user to be able to obtain the interface software that is required at the remote location by downloading it from a host computer, and it is desirable that the interface software be operable on many types of computers that remote users may be using. It is further desirable for a system that provides a familiar interface to a remote user who is accustomed to operating IDE systems.

SUMMARY OF THE INVENTION

The above-referenced deficiencies in the prior art are addressed by the present invention, which provides a remotely accessible, full-featured IDE. Furthermore, in preferred embodiments, the present invention provides a preconfigured, downloadable, platform-independent user interface for a remote user, thus enabling the user to enjoy full control of a complete IDE system to test a selected target system from a remote location. The communication channel between the remote user and the host installation may be the Internet, or it may be a private network or other channel such as a dial-up telephone connection. The user interface may be written in a platform independent language, such as Java. The Java language is particularly well suited for use in this invention because it is platform independent, became Java interpreters are universally available to Internet users, and because Java bytecode was designed to be quickly and reliably transmitted over the Internet and similar networks and to enable high-performance execution on multiple platforms.

This invention is particularly well suited for allowing manufacturers, such as microprocessor and microcontroller manufacturers, to provide their customers with a low-cost and relatively simple way to gain access to an IDE for sampling, testing, and debugging software on their processor products. In presently preferred embodiments, a manufacturer may use this invention to set up an IDE comprising a host computer (which may also be an Internet web server), selectably connected to one or more target systems that it wants to make available to its remote customers. The host/target control computer may be equipped with appropriate toolsets used by persons skilled in the art (compilers, linkers, locators, etc.) to receive program files in various source code languages from users and to produce corresponding executable code to run on the various target systems that may be connected to the host and made available to the users. All of the target-specific software and hardware that is needed to operate or test code on a selected processor may be provided at the host processor, so that the user only needs a generic interface on a remote terminal to be able to operate a full featured IDE. In preferred embodiments of the invention, the host computer and the remote terminal may have a server/client relationship, as is familiar to those skilled in the art.

In a preferred embodiment of the present invention, a user wishing to evaluate the performance of her software on a selected processor manufactured by company X will connect to company X's site on the Internet using her computer, which may be a PC, a Macintosh, a Sparc workstation, or another type of terminal that supports Internet connectivity and a Java interpreter. The user will then be provided with information from the host computer regarding the types of target systems that are available for remote use and other details of the test environment provided by company X. If the user elects to proceed, she will be instructed to download a Java program to her computer which will, when executed, implement a full-featured IDE user interface (including any required communication capabilities) on the user's local computer to control the operation of the host computer and its related peripherals. Through the local user interface, the user will then configure the test system as desired, upload (from the remote terminal to the host system) any programs that she wants to run on the target system, direct the compilation and other functions performed by the host computer, and then receive the results produced by execution of her program under the selected operating conditions. In addition to the output generated by her program, the user will have full access to the IDE facilities associated with the host computer, including perhaps the ability to monitor bus activity, timing, I/O activity, memory activity, and full debug functionality. This invention will thus allow a manufacturer to enable its customers to "test-drive" its processors without requiring customers to invest in costly test apparatus and software. It will also permit software developers to debug versions of software optimized for various diverse processors without requiring them to install a debug system for each processor.

The present invention will thus permit an IDE to be constructed to operate and debug one or more processors and to be shared by local and remote users. Remote users wishing to run or debug programs on a selected processor will no longer have to build a dedicated IDE (or travel to a site where one is available) to do so. This invention will be useful for software developers, who can run and debug software on target systems made available using this invention; for customers who wish to "test drive" several different processors before making a purchasing decision; and for processor manufacturers who can use this invention to allow customers to try out their products, as well as to facilitate software development for those products.

A detailed description of preferred embodiments of this invention is provided below, accompanied by the figures which aid in understanding this invention.

DESCRIPTION OF THE DRAWINGS

So that the manner in which the herein described advantages and features of the present invention, as well as others which will become apparent, are attained and can be understood in detail, more particular description of the invention summarized above may be had by reference to the embodiments thereof which are illustrated in the appended drawings, which drawings form a part of this specification.

It is noted, however, that the appended drawings illustrate only exemplary embodiments of the invention and are therefore not to be considered limiting of its scope, for the invention may admit to other equally effective embodiments.

DESCRIPTION OF PREFERRED EMBODIMENTS

Figure 1:
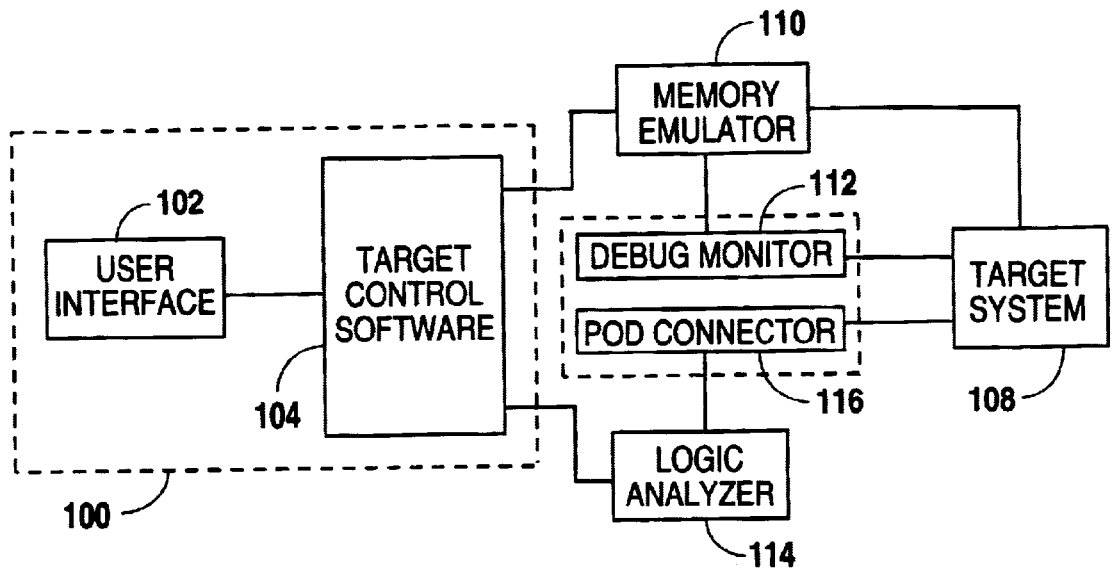
FIG. 1 (prior art) is a block diagram that illustrates a local integrated debug environment (IDE) as is known in the art.
Figure 2:
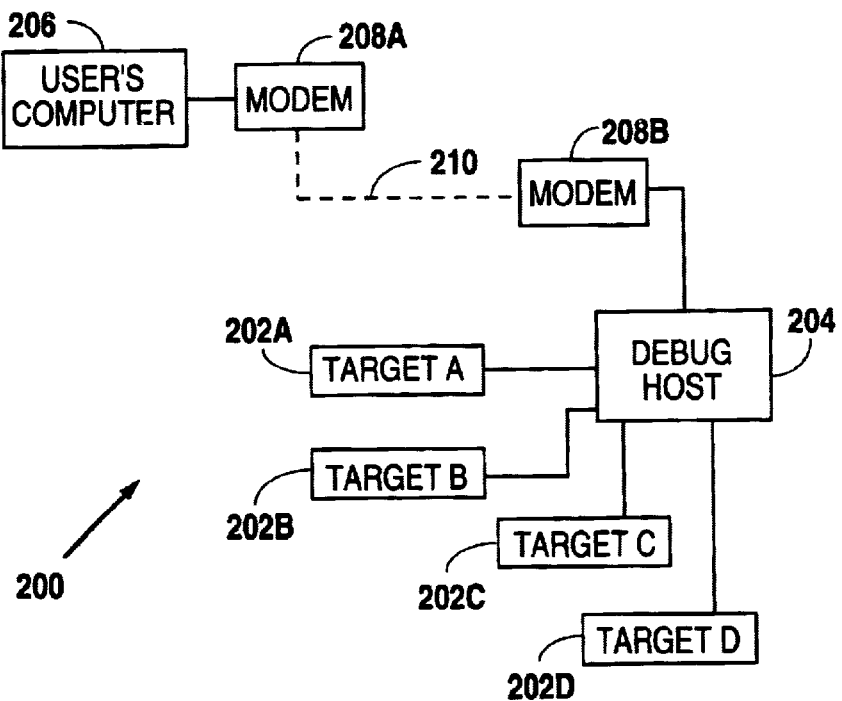
FIG. 2 (prior art) is a block diagram that illustrates a remotely accessible system which permits execution of software on selected processors, which is known in the art.
Figure 3:
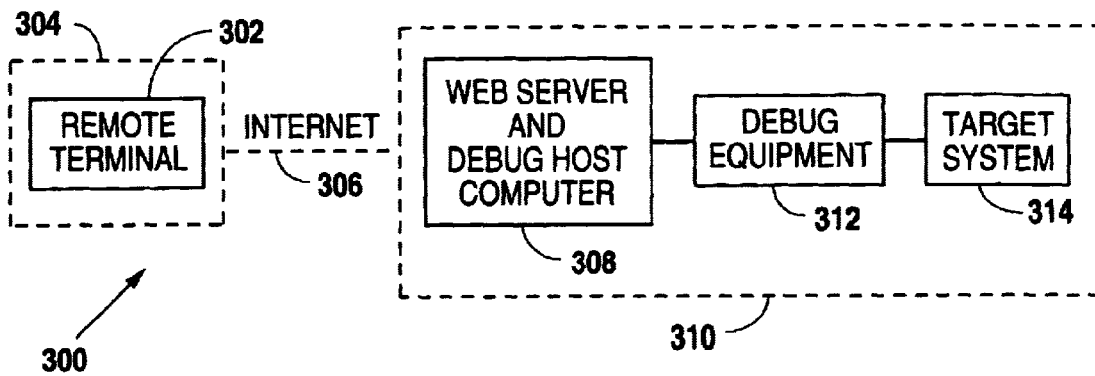
FIG. 3 is a block diagram illustrating a remotely operable integrated debug environment that incorporates the present invention.

FIG. 3 shows a block diagram of a preferred embodiment of the present invention. The remotely accessible Integrated Debug Environment 300 comprises remote terminal 302 located at user's premises 304 and connected to host computer 308 via the Internet 306. Remote terminal 302 is typically a personally computer or a work station which is connected or connectable to the Internet. The computer may be a PC or a work station, such as an X86 personal computer, a Macintosh Computer, a Sparc or HP workstation, or any of various other types of computers which may be available to a user. User's premises 304 may be any distance from the host computer premises 310. User's premises may be within the same building or same company as the host computer 308 or it may be external to the host computer's premises 310. If the remote terminal 302 and the host computer 308 are both within the same company, communication channel 306 may be an "intranet" rather than the Internet. In preferred embodiments, user's computer 302 is equipped with an Internet browser and a Java interpreter. This permits the user, using remote terminal 302, to connect to the Internet, search for web pages, download files, and execute Java applications. The user interface program may be a Java program that is downloaded to the remote terminal in the form of bytecode classes and that is executed on the remote terminal outside of the constraints imposed by a web browser.

Host computer 308 operates in preferred embodiments as a web server and as a debug host computer. In its capacity as a web server, computer 308 is connectable to the Internet and it contains web pages which will be displayed to users who connect to the host computer. The host computer will include digital storage means, such as for example disk drives, optical storage devices, and solid state storage devices for storing computer code, programs and data. In its role as debug host computer, computer 308 will include software tools sets for processing source code software into executable code and debug software for permitting detailed debugging of computer programs which may be run on selectable hardware in the form of target processors. Host computer 308 may also include interface software for connecting to target systems 314 and debug equipment 312.

The combination of hardware and software in the debug host computer creates what is known in the art as an "Integrated Debug Environment" (IDE). The concept of an IDE is well known to those of skill in the art and will not be discussed in detail here. The software toolset included in an IDE typically includes compilers, linkers, locators and debugger programs which permit detailed control of code execution and analysis of target system operation.

Debug host computer 308 does not typically execute the user's code on its own internal processor. Instead, it prepares code for execution on another selected processor installed in what is referred to as a "target system" 314. Target system 314 includes a selected processor upon which it is desired to execute selected code, along with memory, timing circuitry and other components that may be required to perform the desired test or operation. In the case where it is desired to merely execute a user's program on a target processor, the target system 314 can be directly connected with an appropriate cable and interface components to host computer 308, and debug equipment 312 may be omitted from the system. In the event that debugging is desired of software executing on the target system 314, certain debug equipment 312 must be incorporated into the system. Debug equipment 312 may include such components as overlay memory, debug monitors, POD connectors, logic analyzers and related components. This debug equipment 312 permits host computer 308 to control the contents of the memory used by the target processor, speed of execution of the target processor (including single stepping) and other operating parameters. This equipment also may allow for the capture and display of signals present on address and data buses and other conductors within the target system 314 using a logic analyzer or similar equipment.

In the context of an Integrated Debug Environment, the debug equipment, including hardware and software components, is displayed and controlled through a user interface, which is typically a conventional windowed graphical user interface (GUI). The present invention permits user's premises 304 to be remote from host computer premises 310, so that an appropriate user interface and communications capability must be provided to remote terminal 302 in order to allow it to operate as the IDE user interface. In preferred embodiments, the software necessary to implement the user interface on the remote terminal 302 is provided to remote terminal 302 from host computer 308 over the Internet. In preferred embodiments, the software to implement the user interface may be written in Java or in another platform independent programming language, although other languages may be used as well. Java is the presently preferred language for the user interface program because Java bytecode can be readily transmitted over the Internet 306 to remote terminal 302 and executed on remote terminal 302 without the need for specialized versions of the program or translation facilities. Once the Internet connection is established and the user interface is installed and running on remote terminal 302, the user at user's premises 304 can exercise complete control of the Integrated Debug Environment 310 as though he were physically located proximate the host computer. The user may then upload source code programs or (executable code) to the host computer for compilation, linking, locating and execution on the target system. The host computer may collect the output from the program's execution and provide it over the Internet back to remote terminal 302 for review and analysis by the user. If desired, the user may control the full debug functionality of the Integrated Debug Environment 310 using the user interface operating on remote terminal 302 as well.

This invention will therefore permit a user at a remote location to access a full IDE system 310 located at a distance from user's premises 304 using only a computer with a web browser and a Java interpreter, both of which are widely available. It is anticipated that processor manufacturers and others will advantageously use the present invention to implement IDE systems such as the exemplary system described herein including target systems incorporating their various processor products. Users can then, with the aid of this invention, dial into the manufacturer's web site, observe the selection of target processors that are available for testing and debug purposes in the IDE systems, download the required user interface programs (in Java or another platform independent language) and proceed to execute code on the target processor or to debug a program using the target processor. The user will thereby avoid the expense and difficulty associated with setting up an IDE system, including an appropriate tool set and debug environment, for each target systems that is of interest.

In presently envisioned embodiments, the user interface program will be in the form of a Java program that is executed outside of a conventional web browser. The Java program would be downloaded by the user over the Internet, stored on storage means associated with remote terminal 302, and executed independently of the web browser on remote terminal 302. This will permit the user interface program to avoid certain restrictions that are presently placed on the execution of Java applets within the confines of a standard web browser.

Figure 4:
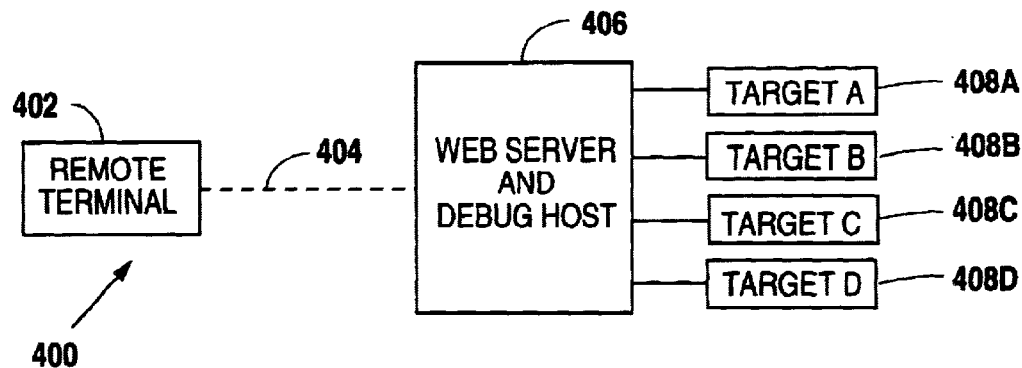
FIG. 4 is a block diagram illustrating a remotely operable integrated debug environment that incorporates the present invention, including provision for a plurality remotely selectable target systems.

FIG. 4 illustrates an exemplary type of IDE that may want be constructed in accordance with the present invention in order to allow remote users to test a number of processors offered by that manufacturer. In this multiple-target environment, several target systems 408A–D are attached to a debug host computer 406. The debug host computer 406 is configured with appropriate hardware and software to enable the remote user to select which of targets A, B, C or D he or she wishes to use for test or debug purposes. Debug equipment, such as logic analyzers and overlay memory, may be included in such a system, although it is not explicitly shown in FIG. 4.

A remote user may use a system as shown in FIG. 4 by using remote terminal 402 to connect to debug host computer 406 via the Internet 404 or other communication channel. The web pages posted on the web server of host computer 406 will indicate what targets were available for program execution and for debug purposes, and it will provide additional information that would be useful to the user. If the user decides that he or she wishes to work with one of the available targets, the user will download user interface software over the Internet and execute that software on remote terminal 402 to facilitate remote control of host computer 406 and the Integrated Debug Environment, as was described in connection with FIG. 3 above.

Figure 5:
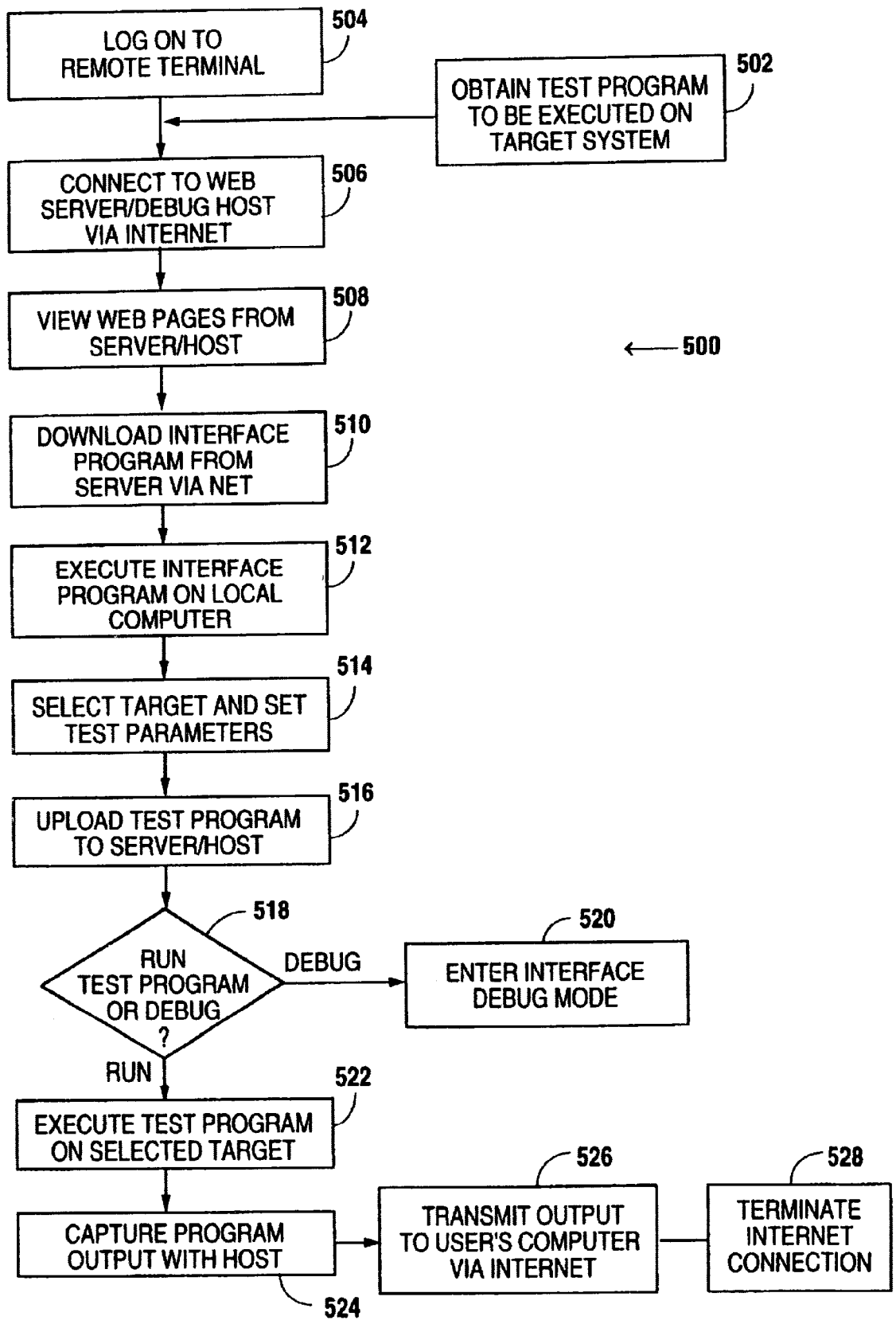
FIG. 5 is a flow chart illustrating an exemplary method of remotely operating or debugging a target system, using a system that embodies the present invention.

FIG. 5 shows a flow chart of a preferred embodiment of a method of using the remotely accessible Integrated Debug Environment according to this invention. This method 500 provides a user with the capability of having a desired computer program executed on a selected target processor made available at a remote location, for example by a manufacturer of the processor. For purposes of this description, the user's computer will be referred to as the "remote terminal" because it is remote from the target system, which is located proximate a host computer. The remote terminal will typically be a personal computer or a work station that is capable of executing the user interface software that is downloaded from the host computer. In using an Integrated Debug Environment (IDE), the user typically will create or obtain a computer program that he or she wishes to execute on the target processor. That computer program is written in so-called source code, which is the high-level programming language in which the programmer works. Before that source code program can be run on the target processor, it must be translated into an executable form, often referred to object code, which will run directly on the target processor. The process of translating the source code into object code involves the steps of compiling, linking, locating, etc. In the Integrated Debug Environment of this invention, those steps are typically performed on the host computer.

Referring to FIG. 5, the method 500 in a preferred embodiment of this invention comprises the following steps. First, the user logs on to remote terminal (504), which is a computer or work station with communication facilities that enable it to access the Internet. The user writes or obtains a test program (502) to be executed on the target system. The user then connects to the host computer over the Internet (506) and views web pages that are provided by the host computer in its role as a web server (508). Once the user determines that the host computer to which he or she is connected is available for testing and debugging on the target processors of interest, the user proceeds to download a user interface for the Integrated Debug Environment from the host computer via the Internet (510). The user then exits the web browser software on the remote terminal and executes the user interface program on the remote terminal (512). The user interface is preferably written in the Java programming language or another platform independent language so that it can be executed by many types of computers that would commonly be used as remote terminals in this type of application. The user interface program may include communication facilities for connection to the host computer over the Internet at high speed so that the host computer and the rest of the IDE can be controlled by the user in real time. In a high speed environment, the user of this system would notice only minimal communication delays between the use of a remote terminal to control the IDE and the use of a local terminal to control the IDE. In alternative embodiments, the user interface may be written in other programming languages, and the interface program may be provided to the user by means other than download over the Internet. For example, the interface program may be distributed in the form of executable code designed for one or more specific platforms, or the interface may be distributed in the form of source code in a widely used programming language (e.g., C++) that the user can adapt for use on user's particular platform After the user interface is installed and executing on the remote terminal, the user can establish communication with host computer via the Internet or another channel. The user will then select the target processor to be tested and set test parameters to be used by host system (514). At that point, the user may load the program that is to be executed on the target processor from the remote terminal to the host computer. The host computer will then proceed to translate the source code user program into object code for execution by the target processor. All of the toolset programs that are required to perform that translation will be available on the host computer and will be chosen to be those necessary for preparing programs for execution on the available target processors. The user may be given the choice of running at test program and observing the output from the program, or the user may select to invoke the interactive debug capabilities of the IDE. If the user wishes to perform debug activities, he or she will enter an interactive debug mode (520) and be presented with a debug interface as is familiar to those skilled in the art, which will enable the user to control host computer (308), debug equipment (312), and to observe the information which such a system typically provides to user.

If the user elects to merely run a program on a target processor and observe the output results, the test program will be executed on the target processor under the control of the host computer (522). The host computer will capture the program output from the target processor and other information which may be selected by user via remote user interface (524). The output from the test program will be transmitted to the user's remote terminal from the host computer via the Internet (526). At the end of the session, the user may terminate the Internet connection and the use of the host computer (528). The user interface program may be retained on the remote terminal for future use, or it may be discarded by the user to free up storage space on the remote terminal.

It is anticipated that various manufacturers and other parties may provide remotely accessible IDE systems in accordance with this invention which will require different user interface programs. Because the interface programs will be written in platform independent languages such as Java, and they will be available for download from the host computers, it will be a simple matter for a user to obtain the user interface program that is necessary to connect to any given host computer, which is identified as being connected to a particular target processor that is of interest to the user.

Figure 6:
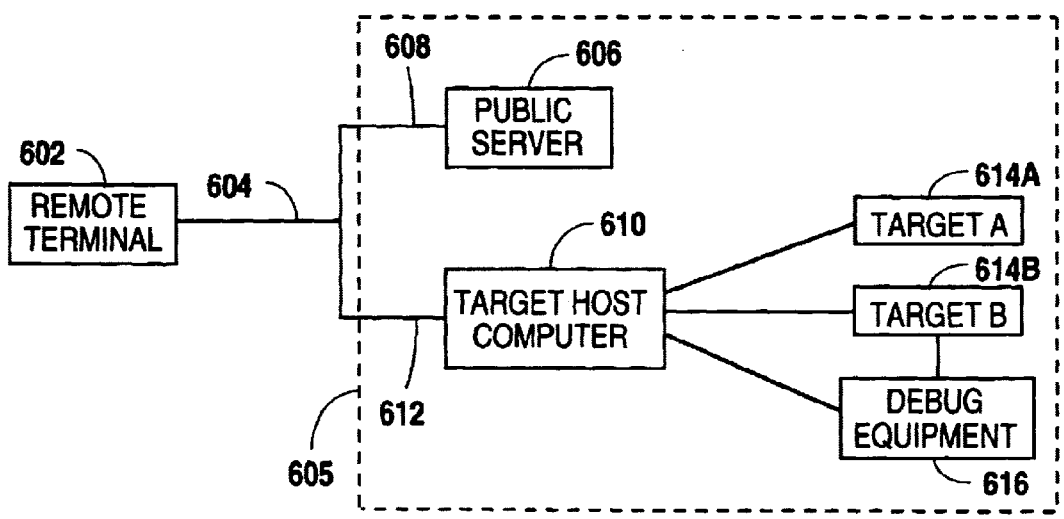
FIG. 6 is a block diagram illustrating an alternative embodiment of this invention wherein the public server is a different computer than the target host computer.

Referring to FIG. 6, in an alternative embodiment the web server 606 may be separate from the target host computer 610. Remote terminal 602, public server 606 and target host computer 610 are interconnected by communication channel 604, which may be the Internet. Target systems 614A & B are connected to target host computer 610 such that target host computer 610 can control execution of selected code by target systems 614A & B. Target host computer 610 may also be connected to debug equipment 616, which may also be connected to one or more target systems.

In the embodiment illustrated in FIG. 6, a user will first use remote terminal 602 to communicate with public server 606, which will provide information regarding availability of targets systems, and which will provide downloadable user interface code, as described above. With the user interface code executing on remote terminal 602, a communication channel 604–612 will be established between remote terminal 602 and target host computer 610. The user can then control the IDE from remote terminal 602, as described above. This and other various arrangements of components are considered within the scope of the present invention.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention.

I claim:

1. A system for executing and debugging computer programs on one or more target processors from remote locations, comprising:

a host computer configured to implement an integrated debug environment for manipulating one or more target processors operably connected to the host computer, the host computer storing a user interface software program;

a communication channel connectable to the host computer; and a remote terminal connectable to the communication channel at a location remote from the host computer, the remote terminal being configurable by the user interface software program to operate as a user interface when the user interface software program is transmitted from the host computer to the remote terminal via the communication channel the user interface being operable to control the debug environment.

2. The system of claim 1, wherein the host computer is configured to operate as a web server, and wherein the communication channel is the Internet.

3. The system of claim 1 wherein the user interface software program is platform independent, such that it can be transmitted from the host computer to the remote terminal over the communication channel and executed on remote terminals of a variety of types.

4. The system of claim 3 wherein the remote terminal comprises a Java interpreter and the user interface software program is written in Java programming language.

5. The system of claim 1, wherein a plurality of target systems are selectably connected to the host computer, and wherein the host computer is configured to select one of the target systems to test as directed by instructions received from the remote terminal.

6. The system of claim 1, further comprising a logic analyzer connected to at least one of said target processors and connected to the host computer.

7. The system of claim 1, further comprising overlay memory connected to at least one of said target processors and connected to the host computer.

8. A system for executing and debugging computer programs on one or more target processors from remote locations, comprising:

a host system configured to operate as an Internet web server and to implement an integrated debug environment for manipulating one or more target processors operably connected to said host system;

a data communication channel connectable to the host system, the data communication channel comprising the Internet; and a remote terminal connectable to the data communication channel at a location remote from the host system, the remote terminal being configurable by a platform independent software program to operate as a user interface when the platform independent software program is transmitted from the host system to the remote terminal via the data communication channel, the user interface being operable to control the debug environment.

9. The system of claim 8 wherein the remote terminal comprises a Java interpreter and the user interface software program is written in Java programming language.

10. The system of claim 8, wherein a plurality of target processors are selectably connected to the host system, such that one of said target processors may be selected for operation by the host system based on signals received from the remote terminal.

11. The system of claim 10, further comprising a debugging system including a logic analyzer that is connectable to a selected one of the plurality of target processors based on signals received from the remote terminal.

12. A remotely accessible integrated debug environment system for enabling a remote user to operate a target processor from a remote terminal, the system comprising:

a remotely accessible public server including digital storage means for storing a user interface program that can be downloaded to the remote terminal, the public server being selectively connectable to the remote terminal via a first data communication channel; and a target host system that is connectable to the remote terminal via a second data communication channel and adapted to convert program code received from the remote terminal into executable code that is executable on the target processor, the target host system being operatively connected to the target processor;

wherein the user interface program is configured to enable the remote user to control the target host system from the remote terminal to operate the target processor, when the user interface program is downloaded to the remote terminal via the first data communication channel.

13. The remotely accessible system of claim 12, wherein the first and second data communication channels comprise the Internet.

14. The remotely accessible system of claim 12, wherein the user interface program is stored on the public server and downloaded to the remote terminal in a platform-independent form.

15. The remotely accessible system of claim 12, wherein the public server and the target host system are implemented in the same computer.

16. A method for enabling a user to remotely operate a selected target processor, comprising:

providing a host computer adapted to convert source code programs into code that is executable on the target processor, a remote terminal that is connectable to the host computer by a communication channel, said host computer including storage means for storing a user interface program that is executable on the remote terminal;

connecting the remote terminal to the host computer via the communication channel;

transferring the user interface program from the host computer to the remote terminal;

executing the user interface program on the remote terminal;

uploading, from the remote terminal to the host computer, a source code program to be executed on the target processor;

converting the source code program into an executable code program using the host computer under the direction of the user via the user interface running on the remote terminal;

executing the executable code on the target processor, under the direction of the user via the user interface running on the remote terminal;

downloading the output generated by the target processor from the host computer to the remote terminal;

disconnecting the remote terminal from the host computer.

17. The method of claim 16, further comprising providing overlay memory and a logic analyzer connected to the target processor and to the host computer, and debugging the executable program under the direction of the user via the user interface running on the remote terminal.

18. The method of claim 16, further comprising providing a platform independent interface program, such that it will execute on various types of remote terminals.

19. A method for controlling, from a remote terminal, a debug environment for operating a target processor, the target processor being operatively coupled to a host system, comprising:

establishing a communication link between the remote terminal and the host system, the host system being adapted to implement the debug environment for operating the target processor;

downloading, via the communication link, a user interface program from the host system to the remote terminal;

executing the user interface program on the remote terminal;

uploading from the remote terminal to the host system, via the communication link and under control of the user interface program, program code for operating the target processor; and controlling the debug environment from the remote terminal via the user interface program to operate the target processor in accordance with the program code.

20. The method as recited in claim 19, further comprising:

generating an output from the target processor based on the operation of the target processor; and downloading the output from the host system to the remote terminal via the communication link.

21. The method as recited in claim 19, further comprising:

converting the program code into an executable code using the host system under control of the user interface program, the executable code being executable on the target processor.

* * * * *